United States Patent
Park et al.

(10) Patent No.: US 10,272,947 B2
(45) Date of Patent: Apr. 30, 2019

(54) SYSTEM AND METHOD FOR GENERATING PATH WHEN DRIVING LANE IS CHANGED

(71) Applicants: Hyundai Motor Company, Seoul (KR); Kia Motors Corporation, Seoul (KR)

(72) Inventors: Chan Il Park, Yanggang-myeon (KR); Beom Jun Kim, Seoul (KR); Kyoung Jun Lee, Seoul (KR); Doo Jin Um, Seoul (KR); Dong Gu Lee, Seoul (KR); Dong Eon Oh, Seoul (KR); Hyun Jae Yoo, Seoul (KR); Min Chul Kang, Uiwang-si (KR); Dae Young Kim, Gwangmyeong-si (KR); Young Min Han, Gunpo-si (KR); Seung Geon Moon, Hwaseong-si (KR); Sung Woo Choi, Gwangmyeong-si (KR); Sung Yoon Yeo, Seoul (KR); Jee Young Kim, Yongin-si (KR); Hoi Won Kim, Gwacheon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/814,245

(22) Filed: Nov. 15, 2017

(65) Prior Publication Data

US 2019/0061819 A1 Feb. 28, 2019

(30) Foreign Application Priority Data

Aug. 24, 2017 (KR) ........................ 10-2017-0107399

(51) Int. Cl.
*B62D 15/02* (2006.01)
*B60W 30/18* (2012.01)
(Continued)

(52) U.S. Cl.
CPC ... *B62D 15/0255* (2013.01); *B60W 30/18163* (2013.01); *B62D 1/28* (2013.01); *G05D 1/0212* (2013.01); *B60W 2550/30* (2013.01)

(58) Field of Classification Search
CPC ................. B62D 15/0255; B62D 1/28; B60W 30/18163; B60W 2550/30; G05D 1/0212
(Continued)

(56) References Cited

U.S. PATENT DOCUMENTS

2012/0083960 A1* 4/2012 Zhu .................. G06T 7/223
701/23
2012/0109462 A1 5/2012 Hong
2016/0307444 A1* 10/2016 Koshizen ............. G08G 1/0133

FOREIGN PATENT DOCUMENTS

JP 5966862 B2 7/2016
KR 10-0589146 B1 6/2006
(Continued)

*Primary Examiner* — Gertrude Arthur Jeanglaude
(74) *Attorney, Agent, or Firm* — Morgan, Lewis & Bockius LLP

(57) ABSTRACT

A system for generating a path when a travel lane of a driver's vehicle is changed, may include a detector configured to recognize line information on a front side of the driver's vehicle, an input device configured to input a lane changing command of the driver's vehicle, and a controller configured to generate a lane changing path using vehicle behavior information generated based on the lane changing command and the line information and target behavior information, and to compare a time period until the driver's vehicle overlaps a line when the driver's vehicle changes the line and a time period which is set to maintain a current travel lane to control the lane changing path.

20 Claims, 14 Drawing Sheets

(51) Int. Cl.
*B62D 1/28* (2006.01)
*G05D 1/02* (2006.01)

(58) Field of Classification Search
USPC .......................................................... 701/25
See application file for complete search history.

(56) References Cited

FOREIGN PATENT DOCUMENTS

| KR | 20-2014-0004529 U | 7/2014 |
| KR | 10-1480652 B1 | 1/2015 |
| KR | 10-1724887 B1 | 4/2017 |

\* cited by examiner

SYSTEM AND METHOD FOR GENERATING PATH WHEN DRIVING LANE IS CHANGED

CROSS-REFERENCE(S) TO RELATED APPLICATIONS

The present application claims priority to Korean Patent Application No. 10-2017-0107399, filed on Aug. 24, 2017, the entire contents of which is incorporated herein for all purposes by this reference.

BACKGROUND OF THE INVENTION

Field of the Invention

The present invention relates to a system and a method for generating a path when a driving path is changed, and, more particularly, to a technology of generating a path that satisfies automatically commanded steering function (ACSF) regulations.

Description of Related Art

In recent years, studies regarding autonomous vehicles have accelerated, and vehicles that may be partially autonomously, or fully autonomously, driven on highways are expected to be mass-produced by 2020.

To autonomously drive a vehicle, it is necessary to automatically change a driving lane. Conventional methods of changing a lane include a method of generating a path for changing a lane and following the generated path.

Furthermore, systems for receiving an input of a driver and automatically changing a lane have been mass-produced for autonomous driving of a vehicle.

The system for changing a lane may inform surrounding vehicles of a change of a lane when the lane of the vehicle is changed, but no technology of maintaining a lane in which the vehicle is currently driven to satisfy the ACSF regulations is known. Accordingly, there exists a demand for a path generating technology which satisfies the ACSF regulations.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

The present invention is provided to solve the above-described problems of the related art, and various aspects of the present invention are directed to providing a system and a method for generating a path when a driving lane is changed, by maintaining a current driving lane for a predetermined time period before the lane is changed.

The technical objects of the present invention are not limited to the above-mentioned, and other unmentioned technical objects will become apparent to those skilled in the art from the following description.

In accordance with an aspect of the present invention, there is provided a system for generating a path when a travel lane of a driver's vehicle is changed, the system including
a detector configured to recognize line information on a front side of the driver's vehicle, an input device configured to input a lane changing command of the driver's vehicle, and a controller configured to generate a lane changing path using vehicle behavior information generated based on the lane changing command, the line information, and target behavior information, and to compare a time period until the driver's vehicle overlaps a line when the driver's vehicle changes the line and a time period which is determined to maintain a current travel lane to control the lane changing path.

In an exemplary embodiment of the present invention, the detector may include a lane information recognizing device that utilizes a camera or a radar provided in the driver's vehicle.

In an exemplary embodiment of the present invention, the line information may include whether the line information is a valid value, a type of the line, a range of the line, a direction of the line, or a color of the line.

In an exemplary embodiment of the present invention, the input device may input a lane changing command through an autonomous driving system provided in the driver's vehicle or a driver.

In an exemplary embodiment of the present invention, the input device may be a turn signal switch.

In an exemplary embodiment of the present invention, the controller may include a vehicle behavior generating device configured to generate current behavior information related to the driver's vehicle including a travel direction and a location of the driver's vehicle based on the line information, a lane changing preliminary path generating device configured to determine whether a lane changing preliminary path is to be generated based on the current behavior information related to the driver's vehicle, and to allow the driver's vehicle to travel in parallel to a lane in which the driver's vehicle is traveling to generate a lane changing preliminary path, a lane changing path generating device configured to generate a lane changing path of the driver's vehicle using the current behavior information related to the driver's vehicle and target behavior information related to the driver's vehicle, a line overlapping determining device configured to estimate a time period until the driver's vehicle overlaps a line when the driver's vehicle changes the line using a lane changing path of the driver's vehicle, and a lane changing path regenerating device configured to compare a time period until the driver's vehicle overlaps the line and a time period which is determined to maintain a current travel lane when the driver's vehicle changes the line, and to regenerate a lane changing path when the determined time period is greater than the time period until the driver's vehicle overlaps the line.

In an exemplary embodiment of the present invention, the vehicle behavior generating device may determine an angle between the driver's vehicle and the line and a location of the driver's vehicle between the lines, based on the line information.

In an exemplary embodiment of the present invention, the lane changing preliminary path generating device may not generate the lane changing preliminary path or utilizes a lane center path as a lane changing preliminary path when the travel direction and the location of the driver's vehicle exist in a predetermined range.

In an exemplary embodiment of the present invention, the lane changing preliminary path generating device may generate the lane changing preliminary path when the travel direction and the location of the driver's vehicle do not exist in the predetermined range.

In an exemplary embodiment of the present invention, the target behavior information related to the driver's vehicle may include a target curvature of the line, a target heading angle, and a target location.

In an exemplary embodiment of the present invention, the lane changing path generating device may determine parameters, wherein the target curvature of the line is the same as a curvature of a line which is adjacent to the driver's vehicle at a current location, the target heading angle is 0, and the target location is a center location of the target lane.

In an exemplary embodiment of the present invention, the lane changing path regenerating device may output the generated lane changing path when the determined time period is less than a time period until the driver's vehicle overlaps the line.

In accordance with another aspect of the present invention, there is provided a method for generating a path when a travel lane of a driver's vehicle is changed, the method including recognizing line information on a front side of the driver's vehicle, inputting a lane changing command of the driver's vehicle, and generating a lane changing path using vehicle behavior information generated based on the lane changing command and the line information and target behavior information, and comparing a time period until the driver's vehicle overlaps a line when the driver's vehicle changes the line and a time period which is determined to maintain a current travel lane to control the lane changing path.

In an exemplary embodiment of the present invention, the controlling of the lane changing path may include generating current behavior information related to the driver's vehicle including a travel direction and a location of the driver's vehicle based on the line information, determining whether a lane changing preliminary path is configured to be generated based on the current behavior information related to the driver's vehicle, generating a lane changing preliminary path along which the driver's vehicle travels in parallel to a lane in which the driver's vehicle is traveling, generating a lane changing path of the driver's vehicle using the current behavior information related to the driver's vehicle and target behavior information related to the driver's vehicle, estimating a time period until the driver's vehicle overlaps a line when the driver's vehicle changes the line using a lane changing path of the driver's vehicle, and comparing a time period until the driver's vehicle overlaps the line and a time period which is determined to maintain a current travel lane when the driver's vehicle changes the line.

In an exemplary embodiment of the present invention, the generating of the current behavior information related to the driver's vehicle may include determining an angle between the driver's vehicle and the line and a location of the driver's vehicle between the lines, based on the line information.

In an exemplary embodiment of the present invention, the generating of the lane changing preliminary path may include not generating the lane changing preliminary path or using a lane center path as a lane changing preliminary path when the travel direction and the location of the driver's vehicle exist in a predetermined range, and generating the lane changing preliminary path when the travel direction and the location of the driver's vehicle do not exist in the predetermined range.

In an exemplary embodiment of the present invention, the generating of the lane changing path of the driver's vehicle may include configuring parameters wherein, among the target behavior information, a target curvature of the line is the same as a curvature of a line which is adjacent to the driver's vehicle at a current location, determining wherein, among the target behavior information, a target heading angle is 0, and determining wherein, among the target behavior information, a target location is a center location of the target lane.

In an exemplary embodiment of the present invention, the estimating of the time period until the driver's vehicle overlaps the line when the driver's vehicle changes the line may include generating a lane changing path obtained by adding a half of an entire width of the vehicle to the lane changing path, and estimating a time period until the driver's vehicle overlaps the line using a location at which the driver's vehicle overlaps the line in the added lane changing path and line information.

In an exemplary embodiment of the present invention, the comparing of the time period until the driver's vehicle overlaps the line and the time period which is determined to maintain the current travel lane when the driver's vehicle changes the line may include regenerating a lane changing path when the determined time period is greater than a time period until the driver's vehicle overlaps the line.

In an exemplary embodiment of the present invention, the comparing of the time period until the driver's vehicle overlaps the line and the time period which is determined to maintain the current travel lane when the driver's vehicle changes the line may include outputting the lane changing path when the determined time period is less than a time period until the driver's vehicle overlaps the line.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
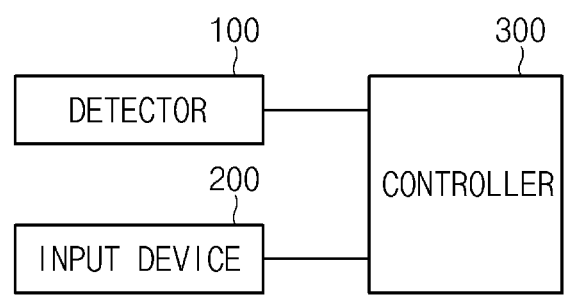
FIG. 1 is a diagram illustrating a system for generating a path when a driving lane is changed according to an exemplary embodiment of the present invention.

It should be understood that the appended drawings are not necessarily to scale, presenting a somewhat simplified representation of various features illustration of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention (s) to those exemplary embodiments. On the contrary, the invention(s) is/are intended to cover not only the exemplary embodiments, but also various alternatives, modifications, equivalents and other embodiments, which may be included within the spirit and scope of the invention as defined by the claims.

Furthermore, terms, including first, second, A, B, (a), (b) or the like may be used herein when describing components of the present invention. The terms are provided to distinguish the elements from other elements, and the essences, sequences, orders, and numbers of the elements are not limited by the terms. Furthermore, unless defined otherwise, all terms used herein, including technical or scientific terms, have the same meanings as those generally understood by those skilled in the art to which the present invention pertains. The terms defined in the generally used dictionaries should be construed as having the meanings that coincide with the meanings of the contexts of the related technologies, and should not be construed as ideal or excessively formal meanings unless clearly defined in the specification of the present invention.

FIG. 1 is a diagram illustrating a system for generating a path when a driving lane is changed according to an exemplary embodiment of the present invention.

Referring to FIG. 1, the system 10 for generating a path when a driving lane is changed may include a detector 100, an input device 200, and a controller 300. Here, the controller 300 may include a vehicle behavior generating device 310, a lane changing preliminary path generating device 320, a lane changing path generating device 330, a line overlapping determining device 340, and a lane changing path regenerating device 350.

The detector 100 may be configured to recognize information on lines in front of a driver's vehicle and may include cameras and radars provided in the driver's vehicle, which are merely an exemplary embodiment for helping understanding of the present invention, and the present invention is not limited thereto.

For example, the line information may include whether line information acquired by the cameras provided in the vehicle is valid, the types of the lines, the ranges of the lines, the directions of the lines, or the colors of the lines.

Here, the line information may be output in a cubic equation as in Equation 1.

$$y=ax^3+bx^2+cx+d \qquad \text{[Equation 1]}$$

Here, a is a change rate of a curvature of a line, b is a curvature of the line, c is a heading angle (HA) between the driver's vehicle (the central direction of the driver's vehicle) and the line (a direction which is parallel to the line), and d is a location of the driver's vehicle between the lines (a position which is separated from the center of the lane, POS).

The input device 200 receives a lane change command by the driver or an autonomous driving system. For example, the driver or the autonomous driving system may input a lane change command by a turn signal switch (a winker, or blinker, switch).

The controller 300 may be configured to generate current behavior information related to the vehicle, generate a lane changing preliminary path, generate a lane changing path, estimate a time period for which the vehicle overlaps a line, and finally regenerate a lane changing path, based on information on a line in front of the driver's vehicle recognized by the detector 100 and a lane change command input from the input device 200.

The controller 300 may be configured to generate current behavior information related to the driver's vehicle including a travel direction (a heading angle) and a location of the driver's vehicle, based on information on a line in front of the driver's vehicle recognized by the detector 100 and a lane change command input from the input device 200.

The controller 300 may be configured to determine whether a lane changing preliminary path is generated, based on current behavior information related to the driver's vehicle, and may generate a lane changing preliminary path wherein the driver's vehicle travels in parallel to the lane in which the driver's vehicle currently travels.

The controller 300 may be configured to generate a lane changing path of the driver's vehicle using current behavior information related to the driver's vehicle and target behavior information related to the driver's vehicle, and may estimate a time period which is taken until the driver's vehicle overlaps a line when the line is changed, using the lane changing path of the driver's vehicle.

The controller 300 may be configured to compare a time period which is taken until the driver's vehicle overlaps a line with a time period which is determined to maintain a current driving lane when the driver's vehicle changes the line, and may regenerate a lane changing path when the determined time is longer than the time period taken until the driver's vehicle overlaps the line.

Figure 2:
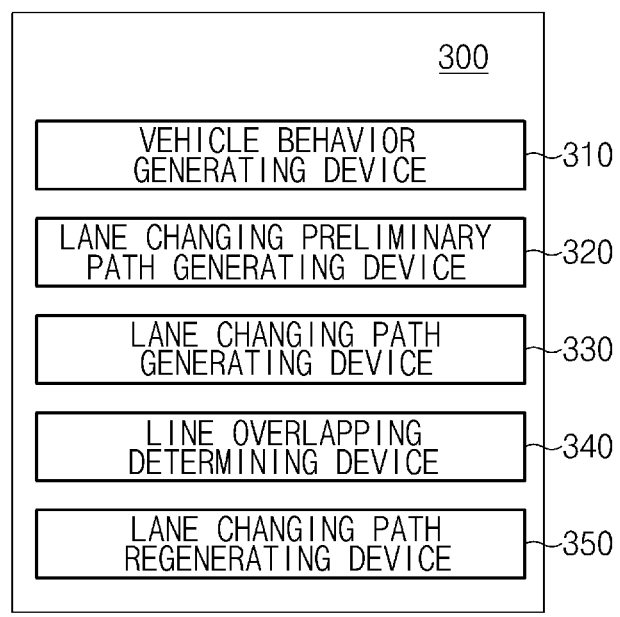
FIG. 2 is a diagram illustrating a controller of a system for generating a path when a driving lane is changed more specifically according to an exemplary embodiment of the present invention.

FIG. 2 is a diagram illustrating, more specifically, a controller of a system for generating a path when a driving lane is changed according to an exemplary embodiment of the present invention.

Referring to FIG. 2, the controller 300 of the system for generating a path when a driving lane is changed according to an exemplary embodiment of the present invention may include a vehicle behavior generating device 310, a lane changing preliminary path generating device 320, a lane changing path generating device 330, a line overlapping determining device 340, and a lane changing path regenerating device 350.

The vehicle behavior generating device 310 generates a travel direction and a location of the driver's vehicle based on information on a line in front of the driver's vehicle. For example, the vehicle behavior generating device 310 may generate an angle between the driver's vehicle (the central direction of the driver's vehicle) and the line (a direction which is parallel to the line) and a location of the driver's vehicle between the lines using line information received from the detector 100. Here, the method for generating a travel direction and a location of the driver's vehicle by the vehicle behavior generating device 310 will be described more specifically with reference to FIG. 4.

The lane changing preliminary path generating device 320 determines whether a lane changing preliminary path is generated, based on a travel direction and a location of the driver's vehicle of the vehicle behavior generating device 310, and generates a path along which the driver's vehicle may travel in parallel to the lane in which the driver's vehicle is traveling before the driver's vehicle changes the lane.

For example, the lane changing preliminary path generating device 320 does not generate a lane changing preliminary path or utilizes a lane center path as the lane changing preliminary path when the travel direction and the location of the current driver's vehicle exist in a travel direction and the location of the driver's vehicle within a predetermined range (for example, the travel direction and the location of the driver's vehicle are not distorted), and generates a lane changing preliminary path when the travel direction and the location of the current driver's vehicle do not exist in a travel direction and the location of the driver's vehicle within the predetermined range (for example, the travel direction and the location of the driver's vehicle are distorted).

The lane changing preliminary path generating device 320 may use the lane center path as the lane changing preliminary path when the driver's vehicle travels along a lane center path (a lane maintaining path), may use a path obtained by adding a distance d separated from the lane center path (lane maintaining path) to the lane center path when the driver's vehicle travels along a path of the distanced, or may generate a lane changing preliminary path along which the driver's vehicle may travel in parallel to the lane when the travel direction and the location of the driver's vehicle are different from the travel direction and the location in the predetermined range (for example, the travel direction and the location of the driver's vehicle are distorted). Here, a detailed method for determining whether a lane changing preliminary path is generated by the lane changing preliminary path generating device 320 and generating the lane changing preliminary path will be described more specifically with reference to FIG. 5A, FIG. 5B, FIG. 5C, and FIG. 5D.

The lane changing path generating device 330 generates a lane changing path of the driver's vehicle using current behavior information and target behavior information related to the driver's vehicle. For example, the current behavior information related to the driver's vehicle may include a curvature of a lane which is adjacent to the driver's vehicle at a current location, and a heading angle (travel direction) and a location of the driver's vehicle, and the target behavior information related to the driver's vehicle may include a target curvature of a lane which is adjacent to the driver's vehicle at a target location, and a target heading angle (target travel direction) and a target location of the driver's vehicle. For example, in the target behavior information related to the driver's vehicle, the target curvature of the lane may be the same as the curvature of the lane which is adjacent to the driver's vehicle at the current location, the target heading angle may be 0, and the target location may be a center location of the target lane. Here, a detailed method for generating a lane changing path of the driver's vehicle by the lane changing path generating device 330 will be described more specifically with reference to FIG. 6.

The line overlapping determining device 340 estimates a time period until the driver's vehicle overlaps the corresponding line when the driver's vehicle changes the line, using a lane changing path generated by the lane changing path generating device 330. Here, a method for estimating a time period until the driver's vehicle overlaps the line, by the line overlapping determining device 340 will be described more specifically with reference to FIG. 7.

The lane changing path regenerating device 350 compares a time period until the driver's vehicle overlaps the line estimated by the line overlapping determining device 340 and a time period which is set in the ACSF regulations to maintain a current travel lane when the driver's vehicle changes the line to regenerate a lane changing path. Here, a method for regenerating a lane changing path of the driver's vehicle by the lane changing path regenerating device 350 will be described more specifically with reference to FIG. 7.

Figure 3:
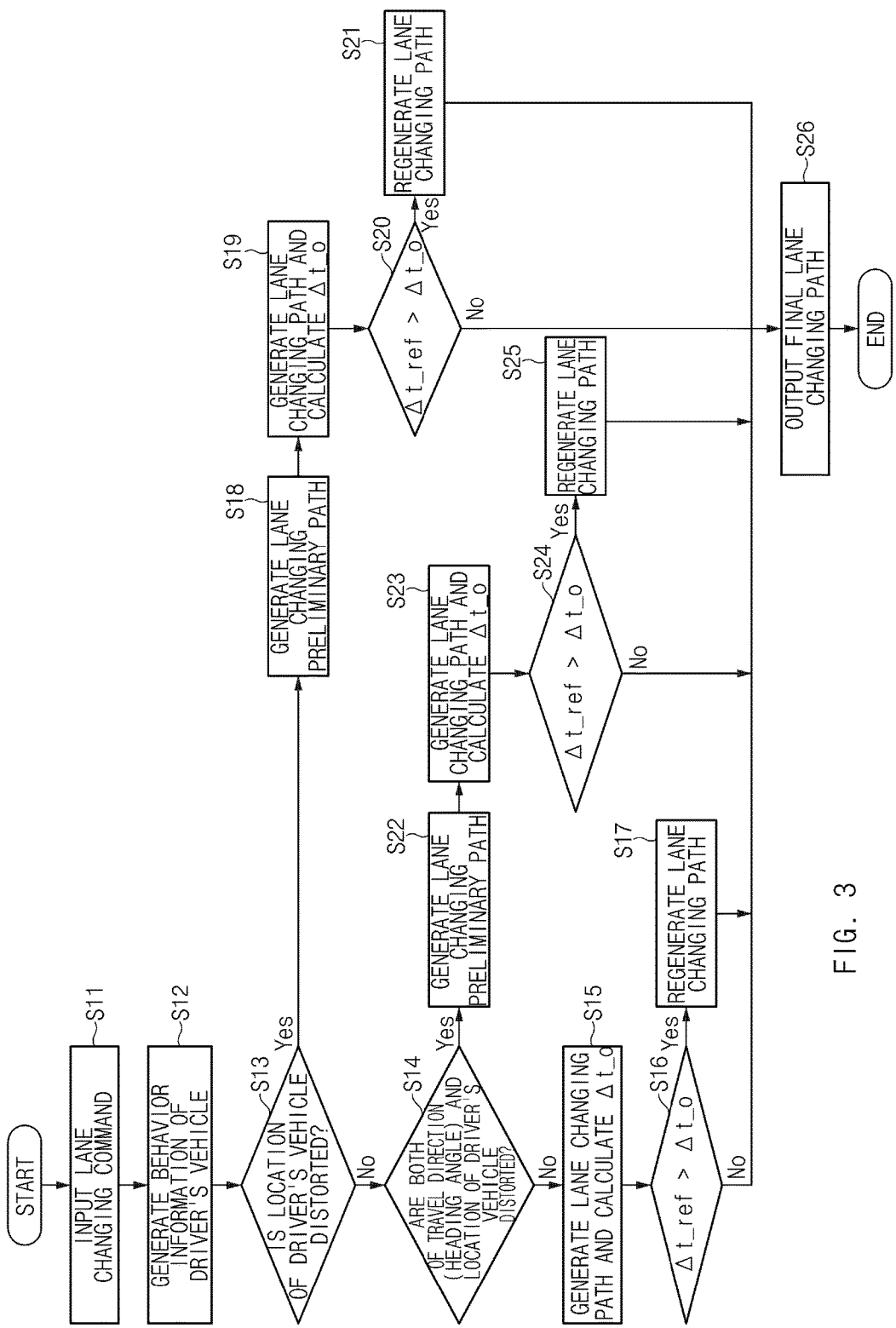
FIG. 3 is a flow chart illustrating a method for generating a path when a driving lane is changed according to an exemplary embodiment of the present invention.

FIG. 3 is a flow chart illustrating a method for generating a path when a driving lane is changed according to an exemplary embodiment of the present invention.

Referring to FIG. 3, operations S11 to S26 of a method for a path when a travel lane is changed according to an exemplary embodiment of the present invention will be described more specifically with reference to FIG. 1 and FIG. 2.

In operations S11 and S12, the vehicle behavior generating device 310 of the system 10 for generating a path when a travel lane is changed generates current behavior information related to the vehicle based on line information on the front side of the driver's vehicle recognized by the detector 100 and the lane changing command input from the input device 200.

In operation S13, the lane changing preliminary path generating device 320 determines whether a lane changing preliminary path is to be generated, based on current behavior information related to the vehicle including a travel direction and a location of the driver's vehicle. For example, the lane changing preliminary path generating device 320 may compare the location of the driver's vehicle and a predetermined location to determine whether the driver's vehicle is at a different location (whether the location is distorted).

In operation S14, when the location of the driver's vehicle is different from the predetermined location in the comparison, the lane changing preliminary path generating device 320 determines whether a lane changing preliminary path is to be generated, based on the current behavior information related to the vehicle. For example, the lane changing preliminary path generating device 320 may determine whether the travel direction and the location of the driver's vehicle are distorted after comparing the travel direction of the driver's vehicle with a predetermined travel direction and a predetermined location.

In operation S15, when neither of the travel direction and the location of the driver's vehicle is distorted after the travel direction and the location of the driver's vehicle being compared with the predetermined travel direction and the predetermined location, the lane changing path generating device 330 generates a lane changing path of the driver's vehicle and the line overlapping determining device 340 determines a time period (Δt_0) until the driver's vehicle overlaps the line, based on the generated lane changing path.

In operation S16, the lane changing path regenerating device 350 compares a time period (Δt_0) until the driver's vehicle overlaps the line estimated by the line overlapping determining device 340 and a time period (Δt_ref) which is set to maintain a current travel lane when the driver's vehicle changes the line.

In operation S17, the lane changing path regenerating device 350 regenerates a lane changing path when the time period (Δt_ref) which is set to maintain a current travel lane when the driver's vehicle changes the line is greater than the time period (Δt_0) until the driver's vehicle overlaps the line.

However, the lane changing path regenerating device 350 outputs the generated lane changing path without regenerating a lane changing path when the time period (Δt_ref) which is to maintain a current travel lane when the driver's vehicle changes the line is less than the time period (Δt_0) until the driver's vehicle overlaps the line.

In operation S18, when the location of the driver's vehicle is different from the predetermined location in the determination result of operation S13, the lane changing preliminary path generating device 320 generates a lane changing preliminary path. Here, a detailed method for generating a lane changing preliminary path by the lane changing preliminary path generating device 320 will be described more specifically with reference to FIG. 5B, FIG. 5C, FIG. 5D, FIG. 6, FIG. 7, FIG. 8A, FIG. 8B, FIG. 9, and FIG. 10.

In operation S19, the lane changing path generating device 330 generates a lane changing path of the driver's vehicle, and the line overlapping determining device 340 determines a time period (Δt_0) until the driver's vehicle overlaps the line, based on the generated lane changing path.

In operation S20, the lane changing path regenerating device 350 compares a time period (Δt_0) until the driver's vehicle overlaps the line estimated by the line overlapping determining device 340 and a time period (Δt_ref) which is set to maintain a current travel lane when the driver's vehicle changes the line.

In operation S21, the lane changing path regenerating device 350 regenerates a lane changing path when the time period (Δt_ref) which is set to maintain a current travel lane when the driver's vehicle changes the line is greater than the time period (Δt_0) until the driver's vehicle overlaps the line.

However, the lane changing path regenerating device 350 outputs the generated lane changing path without regenerating a lane changing path when the time period (Δt_ref) which is determined to maintain a current travel lane when the driver's vehicle changes the line is less than the time period (Δt_0) until the driver's vehicle overlaps the line.

In operation S22, when both of the travel direction and the location of the driver's vehicle are distorted from the travel direction and the location of the driver's vehicle in the determination result of operation S14, the lane changing preliminary path generating device 320 generates a lane changing preliminary path. Here, a detailed method for generating a lane changing preliminary path by the lane changing preliminary path generating device 320 will be described more specifically with reference to FIG. 5C, FIG. 5D and FIG. 11.

In operation S23, the lane changing path generating device 330 generates a lane changing path of the driver's vehicle, and the line overlapping determining device 340 determines a time period (Δt_0) until the driver's vehicle overlaps the line, based on the generated lane changing path.

In operation S24, the lane changing path regenerating device 350 compares a time period (Δt_0) until the driver's vehicle overlaps the line estimated by the line overlapping determining device 340 and a time period (Δt_ref) which is determined to maintain a current travel lane when the driver's vehicle changes the line.

In operation S25, the lane changing path regenerating device 350 regenerates a lane changing path when the time period (Δt_ref) which is determined to maintain a current travel lane when the driver's vehicle changes the line is greater than the time period (Δt_0) until the driver's vehicle overlaps the line.

In operation S26, the lane changing path regenerating device 350 outputs the generated lane changing path without regenerating a lane changing path when the time period (Δt_ref) which is determined to maintain a current travel lane when the driver's vehicle changes the line is less than the time period (Δt_0) until the driver's vehicle overlaps the line.

Figure 4:
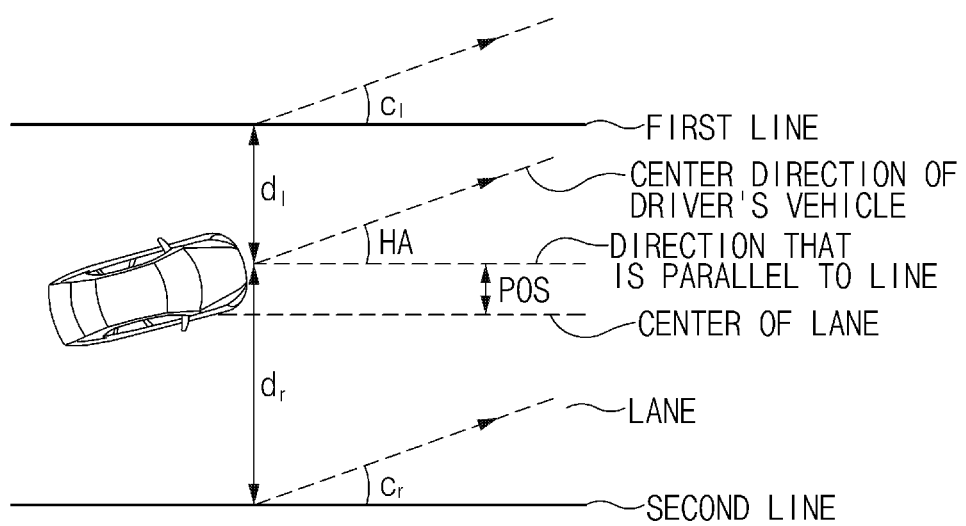
FIG. 4 is a diagram illustrating a vehicle behavior generating device of a system for generating a path when a driving lane is changed according to an exemplary embodiment of the present invention.

FIG. 4 is a diagram illustrating a vehicle behavior generating device of a system for generating a path when a driving lane is changed according to an exemplary embodiment of the present invention.

Referring to FIG. 4, the vehicle behavior generating device 310 generates a travel direction and a location of the driver's vehicle based on information on a line in front of the driver's vehicle.

The vehicle behavior generating device 310 determines an angle (HA) between the driver's vehicle (the central direction of the driver's vehicle) and the line (a direction which is parallel to the line) and a location (POS) of the driver's vehicle between the lines using line information received from the detector 100. For example, an angle HA between the driver's vehicle and the line and a location (POS) of the driver's vehicle between the lines may be determined as in Equations 2 and 3, wherein $C_l$ is an angle between the first line and the center direction of the driver's vehicle, $C_r$ is an angle between the second line and the center direction of the driver's vehicle, $d_l$ is a location of the driver's vehicle which is separated from the first line, and $d_r$ is a location of the driver's vehicle which is separated from the second line.

$$HA = \frac{C_l + C_r}{2} \qquad \text{[Equation 2]}$$

$$POS = \frac{d_l + d_r}{2} \qquad \text{[Equation 3]}$$

FIG. 5A, FIG. 5B, FIG. 5C and FIG. 5D are diagrams for explaining a lane changing preliminary path generating device of a system for generating a path when a driving lane is changed according to an exemplary embodiment of the present invention.

Figure 5A:
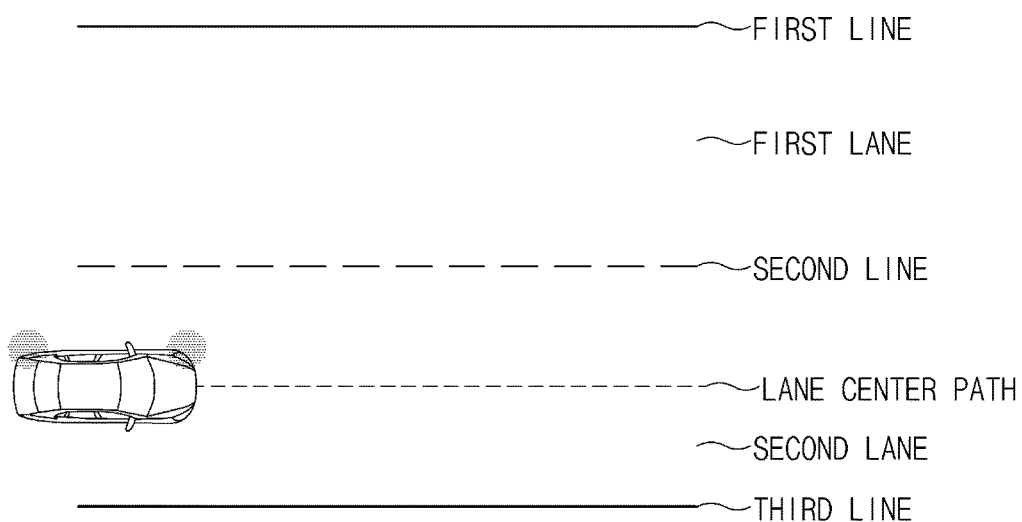
FIG. 5A, FIG. 5B, FIG. 5C, and FIG. 5D are diagrams for explaining a lane changing preliminary path generating device of a system for generating a path when a driving lane is changed according to an exemplary embodiment of the present invention.

Referring to FIG. 5A, the lane changing preliminary path generating device 320 determines whether a lane changing preliminary path is generated, based on a travel direction and a location of the driver's vehicle, and generates a path along which the driver's vehicle may travel in parallel to the lane before the driver's vehicle changes the lane. For example, the lane changing preliminary path generating device 320 may use the lane center path as the lane changing preliminary path when the driver's vehicle travels along the lane center path (lane maintaining path).

Figure 5B:
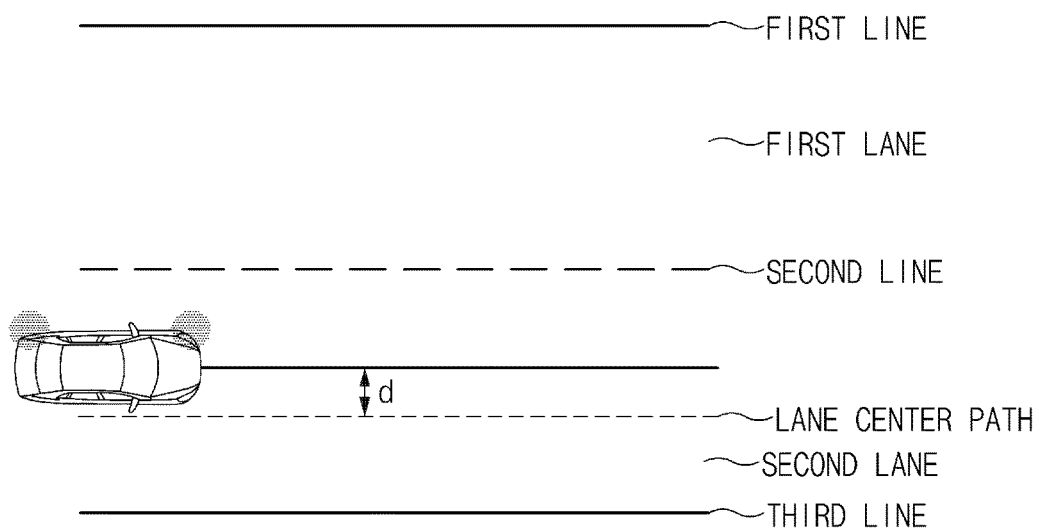

Referring to FIG. 5B, the lane changing preliminary path generating device 320 determines whether a lane changing preliminary path is generated, based on a travel direction and a location of the driver's vehicle, and generates a path along which the driver's vehicle may travel in parallel to the lane before the driver's vehicle changes the lane. For example, the lane changing preliminary path generating device 320 may add a path which is separated from the center path of the lane by a distance d to use the added path as the lane changing preliminary path when the driver's vehicle travels a path of the distance d from the lane center path (lane maintaining path).

Figure 5C:
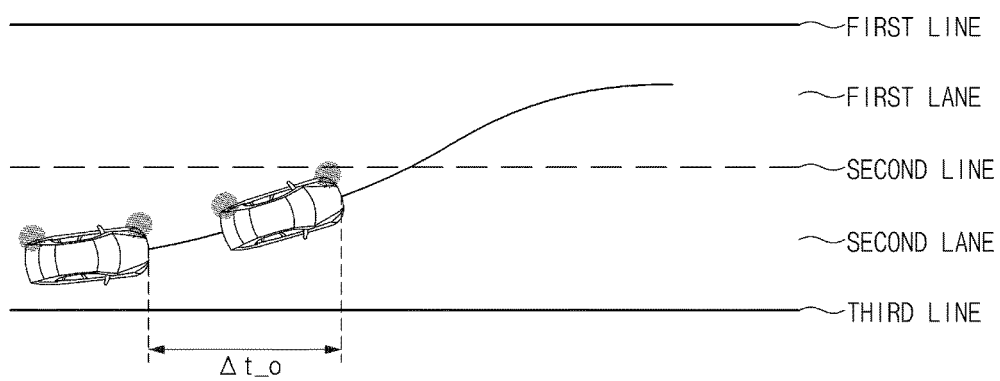
Figure 5D:
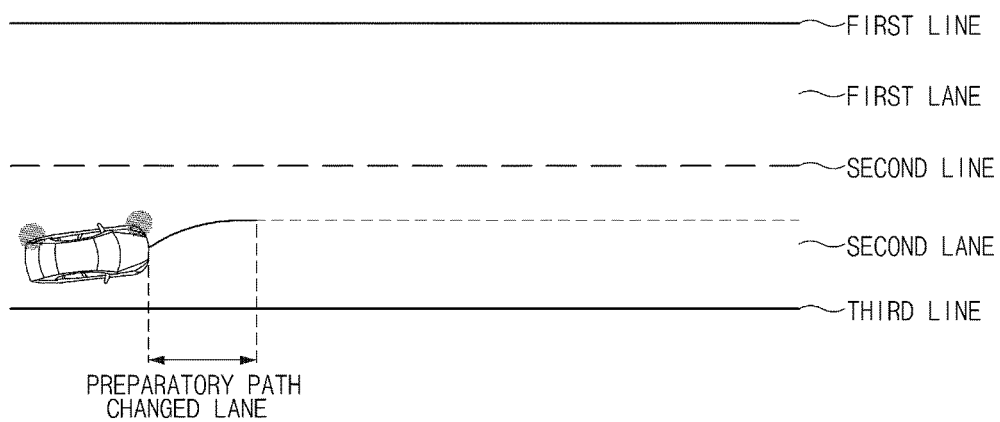

Referring to FIGS. 5C and 5D, the lane changing preliminary path generating device 320 determines whether a lane changing preliminary path is generated, based on a travel direction and a location of the driver's vehicle, and generates a path along which the driver's vehicle may travel in parallel to the lane before the driver's vehicle changes the lane. For example, the lane changing preliminary path generating device 320 compares the travel direction of the driver's vehicle with a predetermined travel direction and a predetermined location when the travel direction and the location of the driver's vehicle are compared with the predetermined travel direction and the predetermined location and it is determined that the travel direction and the location of the driver's vehicle are distorted, to generate a lane changing preliminary path along which the driver's vehicle may travel in parallel to the lane.

Figure 6:
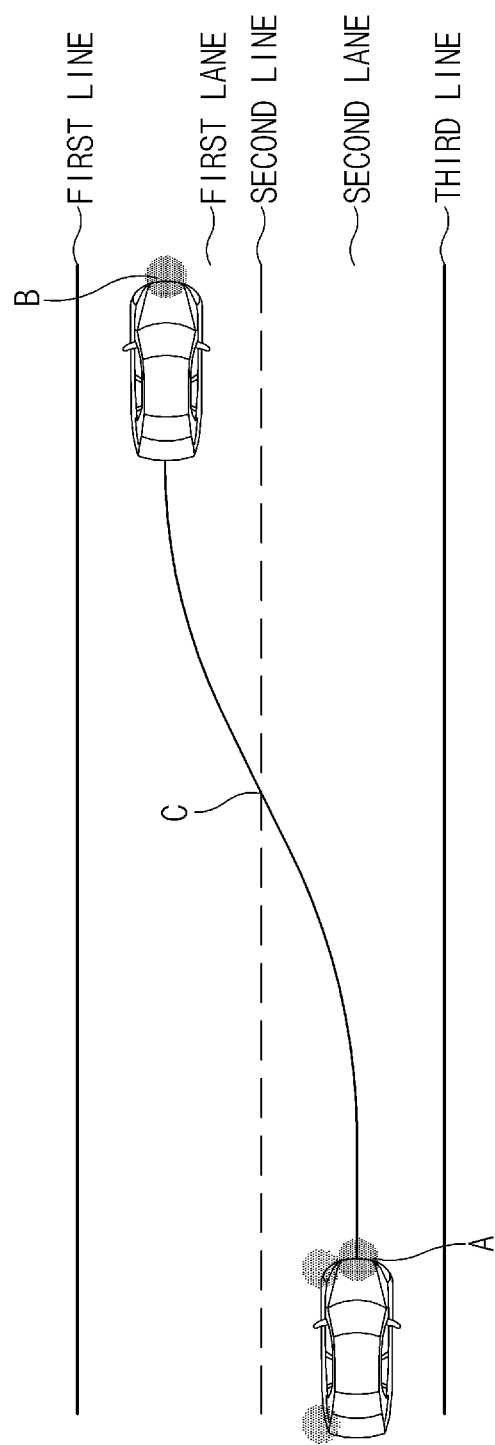
FIG. 6 is a diagram for explaining a lane changing path generating device of a system for generating a path when a driving lane is changed according to an exemplary embodiment of the present invention.

FIG. 6 is a diagram for explaining a lane changing path generating device of a system for generating a path when a driving lane is changed according to an exemplary embodiment of the present invention.

Referring to FIG. 6, the lane changing path generating device 330 generates a lane changing path C of the driver's vehicle using current behavior information and target behavior information related to the driver's vehicle.

The lane changing path generating device 330 may generate a lane changing path C by connecting a current location A of the driver's vehicle in current behavior information related to the driver's vehicle and a target location B of the driver's vehicle in target behavior information.

More specifically, the current behavior information related to the driver's vehicle may include a curvature of the lane which is adjacent to the driver's vehicle at the current location, a heading angle and a location of the driver's vehicle, the target behavior information related to the driver's vehicle may include a target curvature of the line which is adjacent to the driver's vehicle at a target location, and a target heading angle and a target location of the driver's vehicle, and the target behavior information related to the driver's vehicle may be a predetermined value and may be determined by the driver or an autonomous driving system.

For example, in the target behavior information related to the driver's vehicle, the target curvature of the lane may be the same as the curvature of the lane which is adjacent to the driver's vehicle at the current location, the target heading angle may be 0, and the target location may be a center location of the target lane, which is merely an exemplary embodiment for helping understanding of the present invention, and the present invention is not limited thereto.

Figure 7:
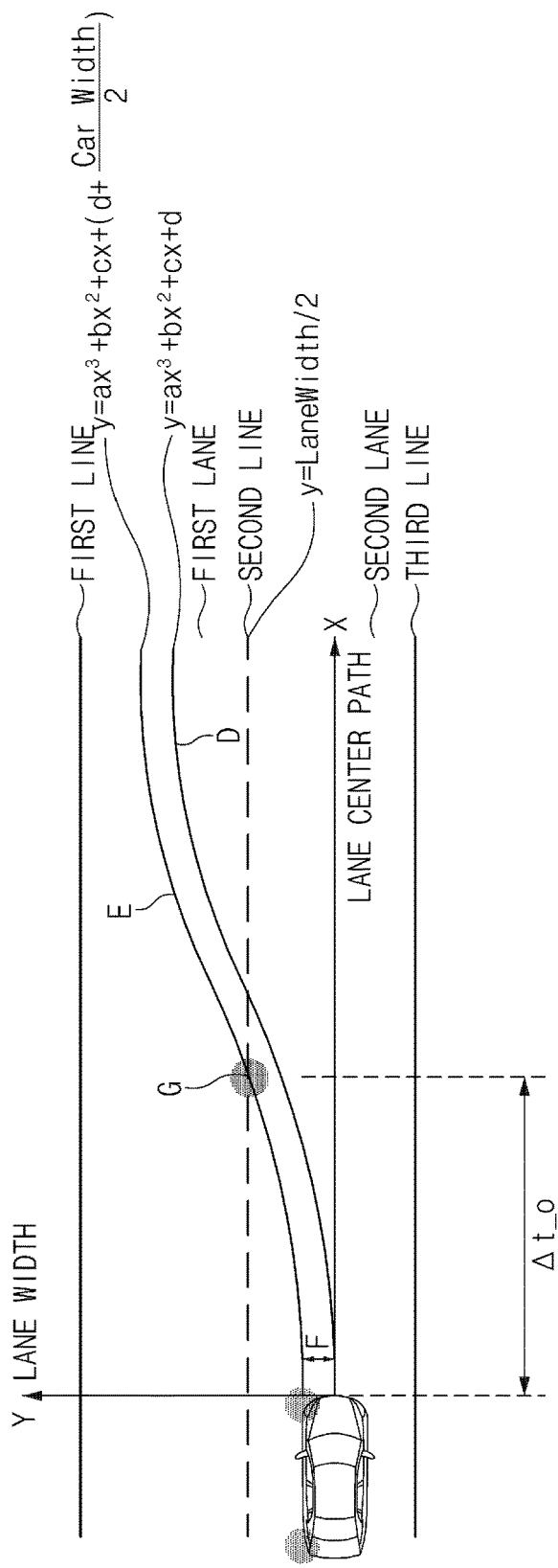
FIG. 7 is a diagram for explaining a line overlapping determining device of a system for generating a path when a driving lane is changed according to an exemplary embodiment of the present invention.

FIG. 7 is a diagram for explaining a line overlapping determining device of a system for generating a path when a driving lane is changed according to an exemplary embodiment of the present invention.

Referring to FIG. 7, the line overlapping determining device 340 estimates a time period ($\Delta t\_0$) until the driver's vehicle overlaps the line using the lane changing path generated by the lane changing path generating device 330 when the driver's vehicle changes the line.

For example, after generating a lane changing path E, which is obtained by adding a half F of the entire width of the vehicle to the lane changing path D generated by the lane changing path generating device 330, the line overlapping determining device 340 may estimate a time period ($\Delta t\_0$) until the driver's vehicle overlaps the line, using a location G at which the driver's vehicle meets the line in the generated lane changing path E and the line information (for example, the second line).

Figure 8A:
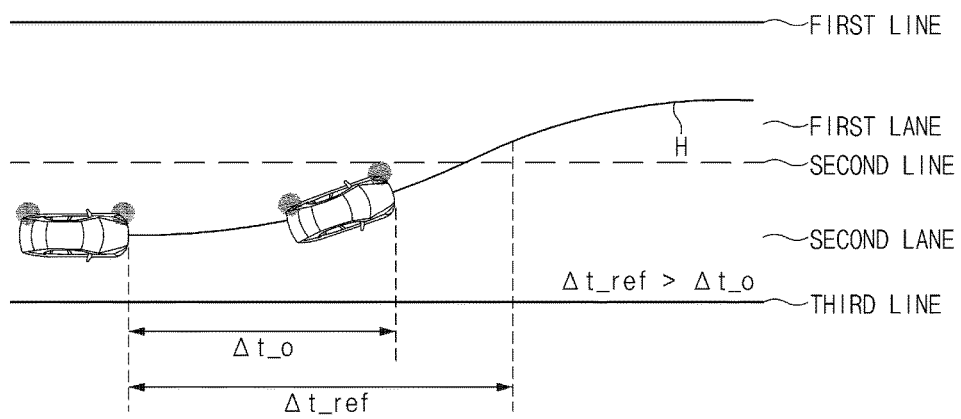
FIG. 8A and FIG. 8B are diagrams for explaining a lane changing path regenerating device of a system for generating a path when a driving lane is changed according to an exemplary embodiment of the present invention.
Figure 8B:
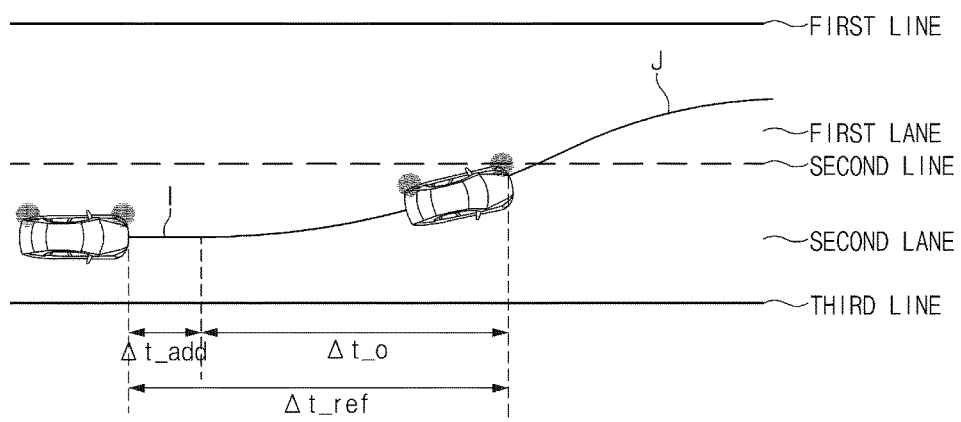

FIGS. 8A and 8B are diagrams for explaining a lane changing path regenerating device of a system for generating a path when a driving lane is changed according to an exemplary embodiment of the present invention.

Referring to FIGS. 8A and 8B, the lane changing path regenerating device 350 compares a time period ($\Delta t\_0$) until the driver's vehicle overlaps the line estimated by the line overlapping determining device 340 and a time period ($\Delta t\_ref$) which is set to maintain a current travel lane when the driver's vehicle changes the line to regenerate a lane changing path.

For example, the lane changing path regenerating device 350 may regenerate a lane changing path J by adding a specific path I to the initially generated lane changing path H (that is, adding a specific time period ($\Delta t\_add$) to the time period ($\Delta t\_0$) until the driver's vehicle overlaps the line), when the time period ($\Delta t\_ref$) which is set to maintain the current travel lane when the driver's vehicle changes the line is greater than the time period ($\Delta t\_0$) until the driver's vehicle overlaps the line.

Figure 9:
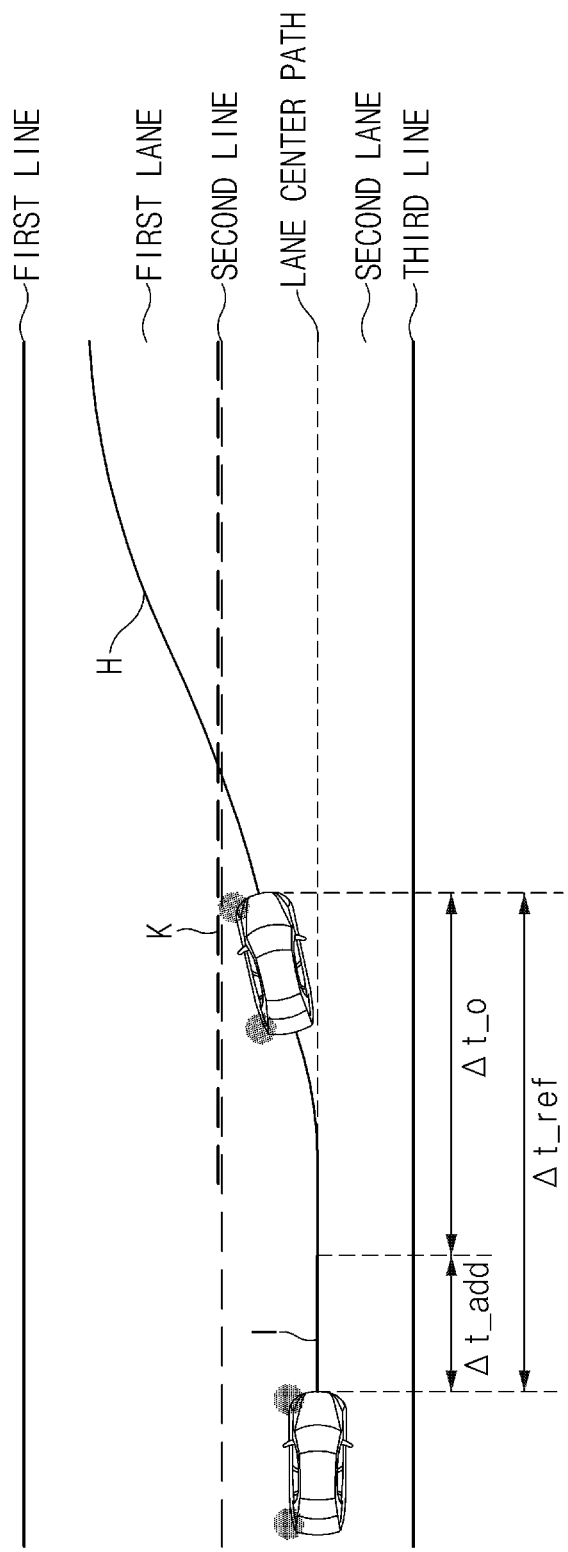
FIG. 9 is a diagram for explaining a method for generating a path when a driving lane is changed according to an exemplary embodiment of the present invention.

FIG. 9 is a diagram for explaining a method for generating a path when a driving lane is changed according to an exemplary embodiment of the present invention.

Referring to FIG. 9, when the driver's vehicle travels along the lane center path (lane maintaining path), the lane changing path regenerating device 350 may add a specific path I to the initially generated lane changing path H. Here, a symmetric line K of the initially generated lane changing path H may be at the same location as the line (for example, the second line).

For example, the lane changing path regenerating device 350 may regenerate a lane changing path by adding a specific path I to the initially generated lane changing path H (that is, adding a specific time period ($\Delta t\_add$) to the time period ($\Delta t\_0$) until the driver's vehicle overlaps the line), when the time period ($\Delta t\_ref$) which is set to maintain the current travel lane when the driver's vehicle changes the line is greater than the time period ($\Delta t\_0$) until the driver's vehicle overlaps the line.

Figure 10:
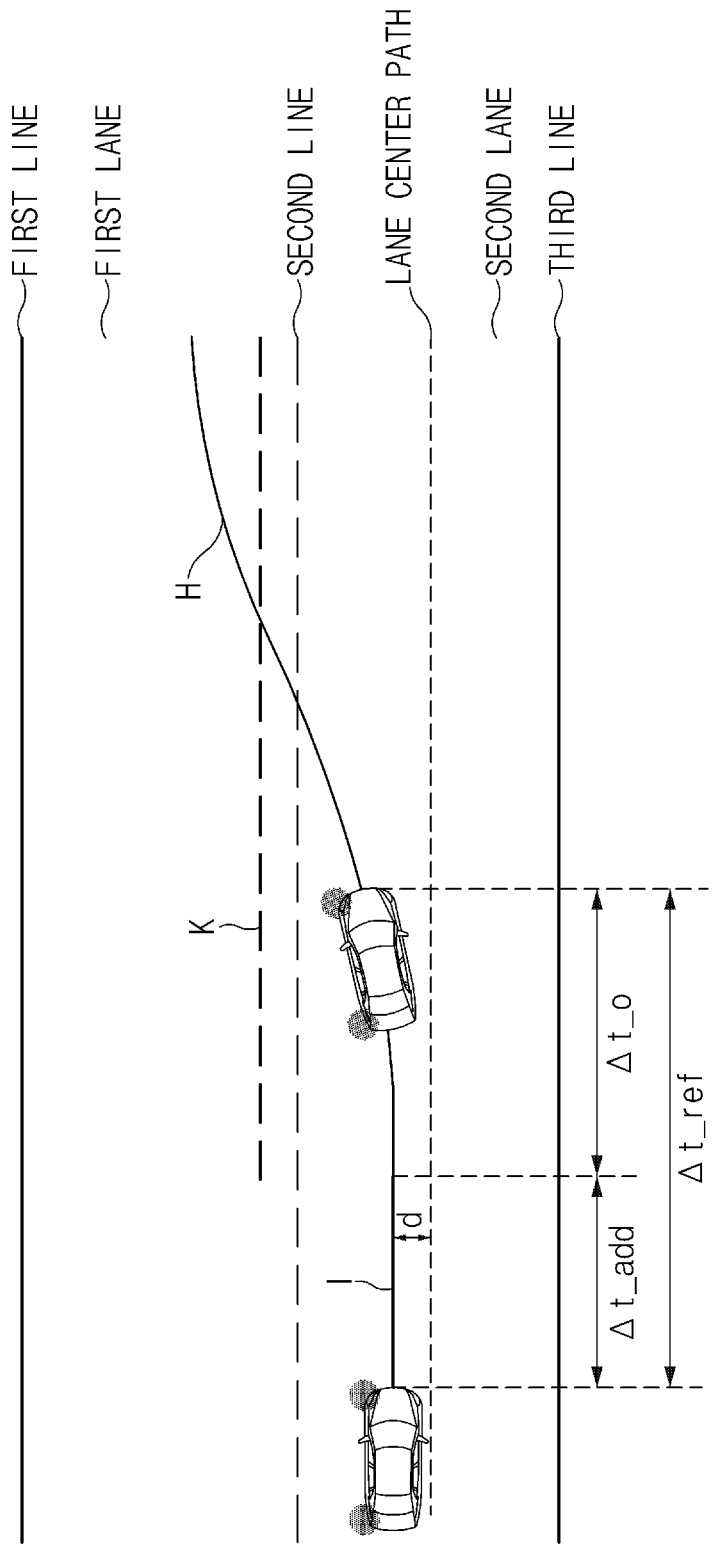
FIG. 10 is a diagram for explaining a method for generating a path when a driving lane is changed according to another exemplary embodiment of the present invention.

FIG. 10 is a diagram for explaining a method for generating a path when a driving lane is changed according to another exemplary embodiment of the present invention.

Referring to FIG. 10, when the driver's vehicle travels a path of a distance d from the lane center path (lane maintaining path) (that is, the location of the driver's vehicle is different or distorted from a predetermined location), the lane changing path regenerating device 350 may add a specific path I obtained by adding a specific distance d from the lane center path to the initially generated lane changing path H. Here, a symmetric line K of the initially generated lane changing path H may be at a location which is different from the line (for example, the second line).

For example, the lane changing path regenerating device 350 may regenerate a lane changing path by adding a specific path I to the initially generated lane changing path H (that is, adding a specific time period ($\Delta t\_add$) to the time period ($\Delta t\_0$) until the driver's vehicle overlaps the line), when the time period ($\Delta t\_ref$) which is determined to maintain the current travel lane when the driver's vehicle changes the line is greater than the time period ($\Delta t\_0$) until the driver's vehicle overlaps the line.

Figure 11:
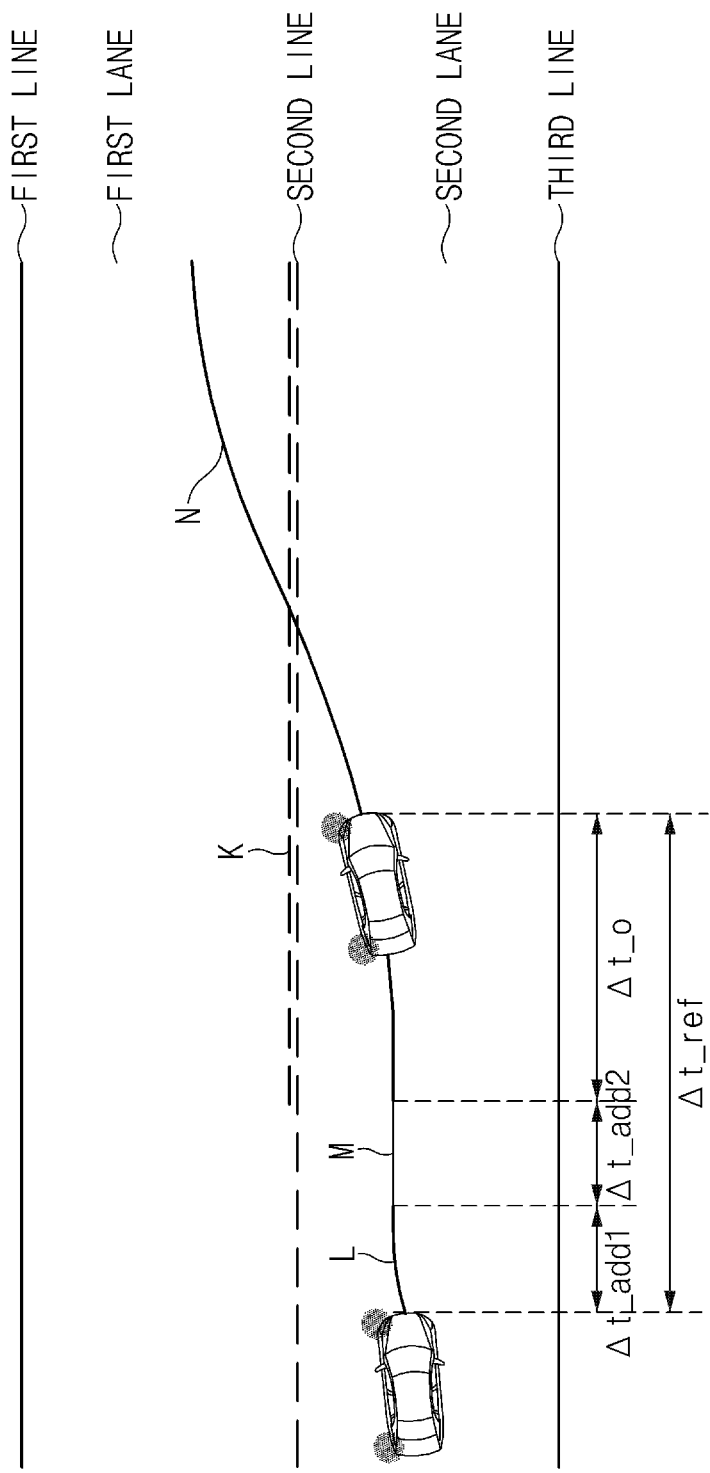
FIG. 11 is a diagram for explaining a method for generating a path when a driving lane is changed according to another exemplary embodiment of the present invention.

FIG. 11 is a diagram for explaining a method for generating a path when a driving lane is changed according to another exemplary embodiment of the present invention.

Referring to FIG. 11, when both of the travel direction and the location of the driver's vehicle are distorted after being compared with the predetermined travel direction and the predetermined location, the lane changing preliminary path generating device 320 may generates a lane changing preliminary path L along which the driver's vehicle may travel in parallel to the lane (that is, a time ($\Delta t\_add1$) for generating a lane changing preliminary path) and may regenerate a lane changing path by adding a specific path M (that is, ($\Delta t\_add2$)) to the lane changing path N. Here, a symmetric line K of the lane changing path N may be at a location which is different from the line (for example, the second line).

Figure 12:
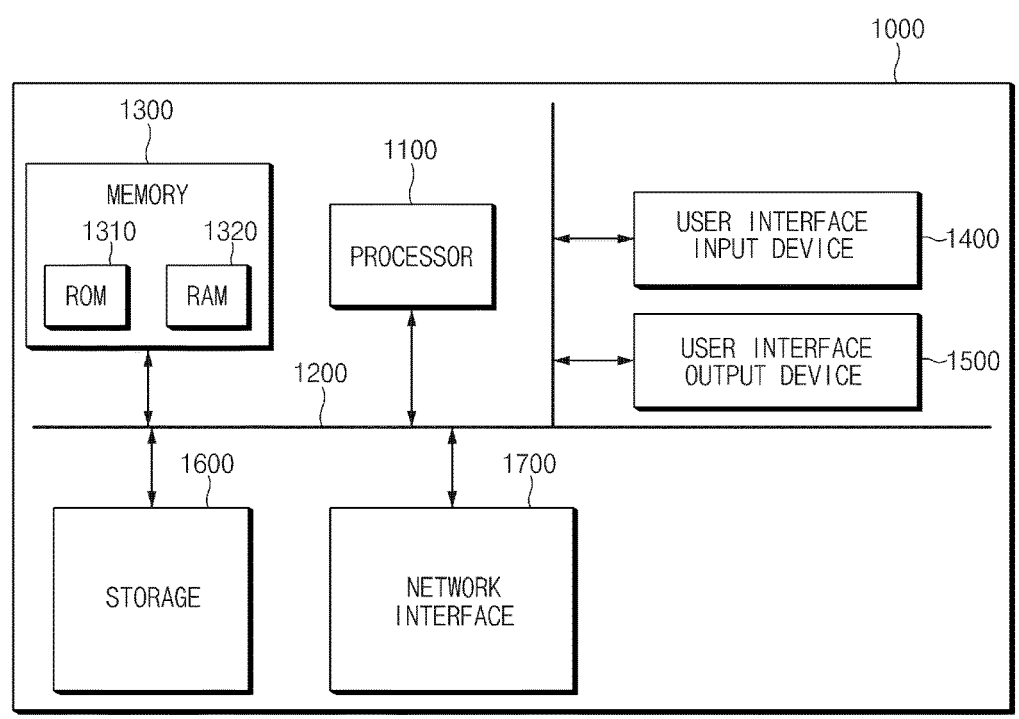
FIG. 12 is a diagram illustrating a computing system that executes a method for generating a path when a driving lane is changed according to an exemplary embodiment of the present invention.

FIG. 12 is a diagram illustrating a computing system that executes a method for generating a path when a driving lane is changed according to an exemplary embodiment of the present invention.

Referring to FIG. 12, the computing system 1000 may include at least one processor 1100 connected through a bus 1200, a memory 1300, a user interface input device 1400, a user interface output device 1500, a storage 1600, and a network interface 1700.

The processor 1100 may be a central processing unit (CPU) or a semiconductor device that processes instructions stored in the memory 1300 and/or the storage 1600. The memory 1300 and the storage 1600 may include various volatile or nonvolatile storage media. For example, the memory 1300 may include a read only memory (ROM) and a random access memory (RAM).

Accordingly, the steps of the method or algorithm described in relation to the exemplary embodiments of the present invention may be implemented directly by hardware executed by the processor 1100, a software module, or a combination thereof. The software module may reside in a storage medium (that is, the memory 1300 and/or the storage 1600), including a RAM memory, a flash memory, a ROM memory, an EPROM memory, an EEPROM memory, a register, a hard disk, a detachable disk, or a CD-ROM. The exemplary storage medium is coupled to the processor 1100, and the processor 1100 may read information from the storage medium and may write information in the storage medium. In another method, the storage medium may be integrated with the processor 1100. The processor and the storage medium may reside in an application specific integrated circuit (ASIC). The ASIC may reside in a user terminal. In another method, the processor and the storage medium may reside in the user terminal as an individual component.

In accordance with the system and the method for generating a path when a travel lane is changed according to an exemplary embodiment of the present invention may not only satisfy the ACSF regulations and but also generate a stable travel lane changing path when a travel lane is changed.

For convenience in explanation and accurate definition in the appended claims, the terms "upper", "lower", "up", "down", "upwards", "downwards", "internal", "outer", "inside", "outside", "inwardly", "outwardly", "internal", "external", "front", "rear", "back", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A system for generating a path when a travel lane of a driver's vehicle is changed, the system comprising:
   a detector recognizing line information on a front side of the driver's vehicle;
   an input device inputting a lane changing command of the driver's vehicle; and
   a controller generating a lane changing path using vehicle behavior information generated based on the lane changing command and the line information and target behavior information, and comparing a time period until the driver's vehicle overlaps a line when the driver's vehicle changes the line and a time period which is set to maintain a current travel lane to control the lane changing path.

2. The system of claim 1, wherein the detector includes:
   a lane information recognizing device that utilizes a camera or a radar provided in the driver's vehicle.

3. The system of claim 1, wherein the line information includes:
   whether the line information is a valid value, a type of the line, a range of the line, a direction of the line, or a color of the line.

4. The system of claim 1, wherein the input device inputs the lane changing command through an autonomous driving system provided in the driver's vehicle or a driver.

5. The system of claim 1, wherein the input device is a turn signal switch.

6. The system of claim 1, wherein the controller includes:
   a vehicle behavior generating device generating current behavior information related to the driver's vehicle including a travel direction and a location of the driver's vehicle based on the line information;
   a lane changing preliminary path generating device determining whether a lane changing preliminary path is to be generated, based on the current behavior information related to the driver's vehicle, and allowing the driver's vehicle to travel in parallel to a lane in which the driver's vehicle is traveling to generate the lane changing preliminary path;
   a lane changing path generating device generating the lane changing path of the driver's vehicle using the current behavior information related to the driver's vehicle and target behavior information related to the driver's vehicle;
   a line overlapping determining device estimating the time period until the driver's vehicle overlaps a line when the driver's vehicle changes the line using the lane changing path of the driver's vehicle; and a lane changing path regenerating device comparing the time period until the driver's vehicle overlaps the line and the time period which is set to maintain the current travel lane when the driver's vehicle changes the line, and regenerating a lane changing path when the set time period is greater than the time period until the driver's vehicle overlaps the line.

7. The system of claim 6, wherein the vehicle behavior generating device determines an angle between the driver's vehicle and the line and a location of the driver's vehicle between the lines, based on the line information.

8. The system of claim 6, wherein the lane changing preliminary path generating device does not generate the lane changing preliminary path or utilizes a lane center path as the lane changing preliminary path when the travel direction and the location of the driver's vehicle exist in a predetermined range.

9. The system of claim 6, wherein the lane changing preliminary path generating device generates the lane changing preliminary path when the travel direction and the location of the driver's vehicle do not exist in a predetermined range.

10. The system of claim 6, wherein the target behavior information related to the driver's vehicle includes a target curvature of the line, a target heading angle, and a target location.

11. The system of claim 10, wherein the lane changing path generating device determines parameters, wherein the target curvature of the line is a same as a curvature of a line which is adjacent to the driver's vehicle at a current location, the target heading angle is 0, and the target location is a center location of a target lane.

12. The system of claim 6, wherein the lane changing path regenerating device outputs the generated lane changing path when the predetermined time period is less than a time period until the driver's vehicle overlaps the line.

13. A method for generating a path when a travel lane of a driver's vehicle is changed, the method comprising:
  recognizing line information on a front side of the driver's vehicle;
  inputting a lane changing command of the driver's vehicle; and
  generating a lane changing path using vehicle behavior information generated based on the lane changing command and the line information and target behavior information, and comparing a time period until the driver's vehicle overlaps a line when the driver's vehicle changes the line and a time period which is set to maintain a current travel lane to control the lane changing path.

14. The method of claim 13, wherein the controlling of the lane changing path includes:
  generating the current behavior information related to the driver's vehicle including a travel direction and a location of the driver's vehicle based on the line information;
  determining whether a lane changing preliminary path is to be generated, based on the current behavior information related to the driver's vehicle;
  generating a lane changing preliminary path along which the driver's vehicle travels in parallel to a lane in which the driver's vehicle is traveling;
  generating the lane changing path of the driver's vehicle using the current behavior information related to the driver's vehicle and target behavior information related to the driver's vehicle;
  estimating the time period until the driver's vehicle overlaps the line when the driver's vehicle changes the line using the lane changing path of the driver's vehicle; and
  comparing the time period until the driver's vehicle overlaps the line and the time period which is set to maintain the current travel lane when the driver's vehicle changes the line.

15. The method of claim 14, wherein the generating e current behavior information related to the driver's vehicle includes:
  determining an angle between the driver's vehicle and the line and a location of the driver's vehicle between the lines, based on the line information.

16. The method of claim 14, wherein the generating of the lane changing preliminary path includes:
  not generating the lane changing preliminary path or using a lane center path as the lane changing preliminary path when the travel direction and the location of the driver's vehicle exist in a predetermined range; and
  generating the lane changing preliminary path when the travel direction and the location of the driver's vehicle do not exist in the predetermined range.

17. The method of claim 14, wherein the generating of the lane changing path of the driver's vehicle includes:
  setting such that, among the target behavior information, a target curvature of the line is a same as a curvature of a line which is adjacent to the driver's vehicle at a current location;
  setting such that, among the target behavior information, a target heading angle is 0; and
  setting such that, among the target behavior information, a target location is a center location of a target lane.

18. The method of claim 14, wherein the estimating of the time period until the driver's vehicle overlaps the line when the driver's vehicle changes the line includes:
  generating a lane changing path obtained by adding a half of an entire width of the vehicle to the lane changing path; and
  estimating the time period until the driver's vehicle overlaps the line using a location at which the driver's vehicle overlaps the line in the added lane changing path and line information.

19. The method of claim 14, wherein the comparing of the time period until the driver's vehicle overlaps the line and the time period which is set to maintain the current travel lane when the driver's vehicle changes the line includes:
  regenerating a lane changing path when the set time period is greater than a time period until the driver's vehicle overlaps the line.

20. The method of claim 14, wherein the comparing of the time period until the driver's vehicle overlaps the line and the time period which is set to maintain the current travel lane when the driver's vehicle changes the line includes:
  outputting the lane changing path when the set time period is less than a time period until the driver's vehicle overlaps the line.

* * * * *